Nov. 4, 1924.   1,514,211
J. C. HESTER
CONVERTIBLE FREIGHT CAR
Filed Feb. 9, 1923
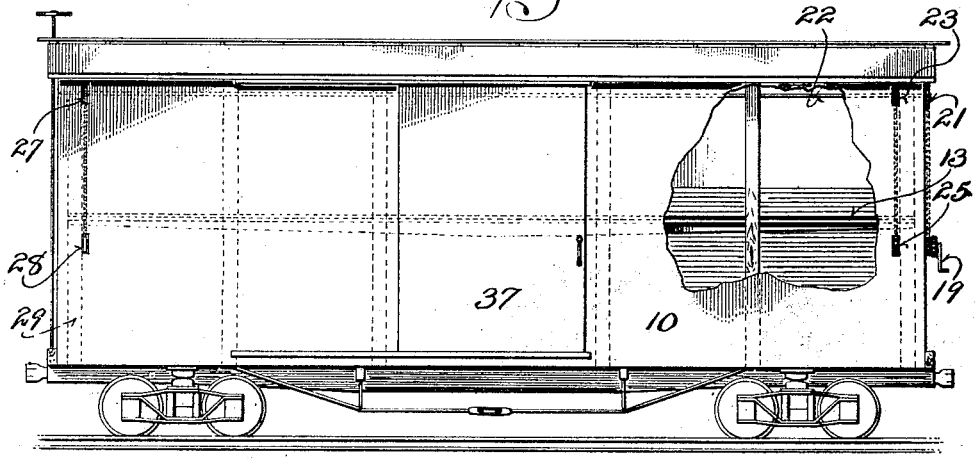
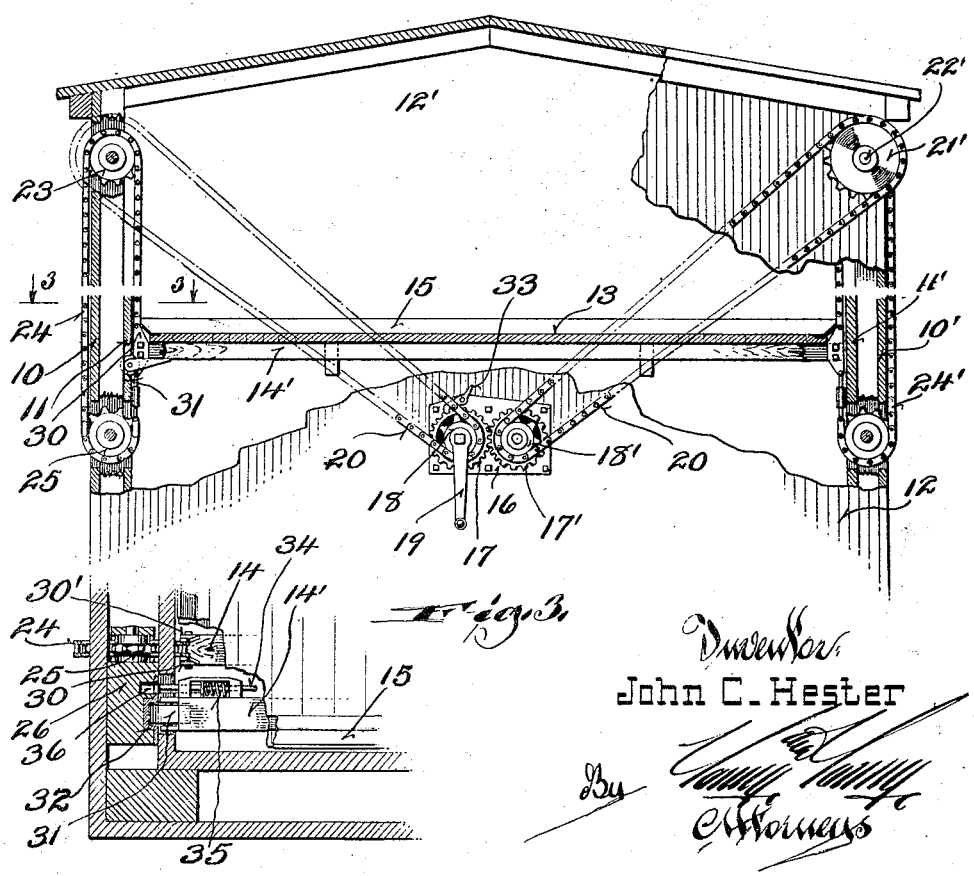
Inventor
John C. Hester
By
Attorneys Patented Nov. 4, 1924.

1,514,211

UNITED STATES PATENT OFFICE.

JOHN C. HESTER, OF MILWAUKEE, WISCONSIN, ASSIGNOR OF ONE-HALF TO GEORGE D. LUSCHER, OF MILWAUKEE, WISCONSIN.

CONVERTIBLE FREIGHT CAR.

Application filed February 9, 1923. Serial No. 617,918.

*To all whom it may concern:*

Be it known that I, JOHN C. HESTER, a citizen of the United States, and resident of Milwaukee, in the county of Milwaukee and State of Wisconsin, have invented certain new and useful Improvements in Convertible Freight Cars; and I do hereby declare that the following is a full, clear, and exact description thereof.

Hitherto cars which have been used for the transportation of sheep and hogs and have been provided with horizontal partitions, forming two compartments for the animals, have been incapable of usage for cattle, as the platform renders the lower compartment too small. Similarly, cars which have hitherto been used for the transportation of cattle have not been useful for sheep and hogs, as they are not divided into upper and lower compartments and consequently are of limited capacity. It is the primary object of the invention to provide a platform in a car which may be used to divide the car into upper and lower compartments in which sheep and hogs may be carried, and which is movable upwardly and downwardly so that the interior of the car may be transformed into a single compartment in which cattle may be transported.

The platform is useful otherwise than with cattle, and where it is desirable to store goods in a single large compartment it may be moved out of the way. If, however, it is desired to provide two compartments, to prevent jambing and damaging of goods, the platform may be utilized for this purpose.

An object of the invention is the provision of a border strip on the platform contiguous to the inner walls of the car, for preventing the accidental insertion of the hoofs of the animals between the platform and the wall, thus possibility of injury is eliminated.

Other objects of the invention are the provision of conveniently operable means for raising and lowering the platform, and of means for locating the platform in an adjusted position.

Other objects will appear as the description proceeds. The invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

Figure 1 is a longitudinal section of the car, showing parts of the device in dotted lines, a portion of the car body being broken away to reveal the platform.

Figure 2 is a vertical transverse partial section of the car, showing the platform in position to divide the car into two compartments, parts of the car being left unsectioned to more clearly show the construction.

Figure 3 is a section on the line 3—3, of the Figure 2, showing the corner of the car.

The car comprises exterior side walls 10—10', interior side walls 11—11', and end walls 12—12'. The platform 13, extends from wall to wall and is made up of a number of longitudinal strips supported on transverse beams 14. A border strip 15, is provided upwardly disposed and contiguous to the walls, the strip having an inclined inner surface and being adapted to prevent the insertion of the hoofs of animals between the platform and the walls.

A plate 16, is secured exteriorly to end walls 12, and carries a pair of rotatably mounted meshing gears 17', gear 17 being rigid with sprocket wheel 18, and gear 17' being rigid with sprocket wheel 18'. Sprocket 18 is rotatable by means of a crank 19, and is operative to drive chain 20, extending upwardly about a sprocket 21, which rotates a shaft 22, extending the entire longitudinal extent of the car between walls 10 and 11. The rotation of shaft 22 operates gear 23, rigid therewith, to cause the travel of endless chain 24, which extends downwardly about a sprocket wheel 25, which is rotatably mounted on an upright 26. Adjacent end wall 12', of the car, a sprocket 27 is positioned on shaft 22, and on the rotation of the shaft 22 is adapted to actuate by an endless chain sprocket wheel 28 rotatably mounted on upright 29. On the rotation of sprocket wheel 18, meshing gears 17—17' turn sprocket wheel 18', and through endless chain 20' rotate sprocket wheel 21', thus turning shaft 22', which extends the entire length of the other side of the car and which is rigid with gears similar to gears 23 and 27 on the shaft 22.

The mechanism with which shaft 22' cooperates is substantially similar to that with which shaft 22 cooperates, and four endless chains are provided, one at each end of the car. Endless chain 24 carries a pair of plates 30—30', which are spread to receive the end of a beam 14, to which they are secured. The other end of this beam is secured to similar plates on an endless chain 24'. It is apparent, therefore, that the turning of crank 19 operates to raise or lower the entire platform, which is maintained at all times substantially horizontal. In the upward or downward movement, the platform is prevented from moving laterally or endwise towards the sides of the car. For this purpose a roller 31, is provided at each end of beam 14', upright 26 having a guide 32 thereon, the groove of which receives the roller. Thus binding of the platform against inner wall 11 is eliminated and lateral or endwise movement of the platform is prevented. A similar roller and guide is provided at each corner of the car. On plate 16 a dog 33, is positioned, adapted to be moved into engagement with the teeth of gear 17, to lock it against rotation. In this way the platform may be secured at a desired elevation. As this lock device necessitates at times a strain on the endless chains and co-operating parts, a plunger 34, may be provided at each end of the car and carried by the beams, the plunger being urged by a spring 35 into a recess 36 in upright 26. Any desired number of recesses may be provided in each of the uprights. The withdrawal of the plungers permits the lowering of the platform.

If desired, the platform may be disposed as shown in Figure 2, where it divides the interior of the car into two compartments. Both compartments are then useful for the transportation of sheep and hogs, in which case a car with slatted sides is, of course, used. The two compartments may be used for goods, however, if desired, and the platform is thus operative to provide additional storing space where it is undesirable to have the weight of goods above press downwardly on goods below. If desired, the platform may be moved immediately adjacent to the top of the car or to the bottom thereof, in either of which cases a single compartment results, in which cattle or goods may be transported. The platform may be moved in such wise as to clear the door 37, and the endless chains 24—24' may be extended to the floor, giving the platform a maximum range of movement. The car may be used for general purposes and, if desired, the platform may be used in a refrigerating car. Instead of raising or lowering the platform through the medium of crank 19, pneumatic means, or any suitable source of power, may be provided for this purpose.

I claim:

The combination of a railroad car having side and end walls, a platform carried within said car, endless chains arranged adjacent each of the corners of the car and having their inner spans connected to said platform, a longitudinally extending shaft located adjacent the upper part of each side portion of the car and having sprocket wheels for driving said chains, means located exteriorly of said car for simultaneously rotating said shafts, locking mechanism for said last mentioned means, additional locking mechanism carried by said platform and adapted to lock said platform with relation to the walls of said car, and a protecting strip extending upwardly from the marginal edges of said platform and having a beveled upper side.

In testimony that I claim the foregoing I have hereunto set my hand at Milwaukee, in the county of Milwaukee and State of Wisconsin.

JOHN C. HESTER